United States Patent
Reding et al.

(10) Patent No.: US 7,433,459 B2
(45) Date of Patent: Oct. 7, 2008

(54) METHODS AND APPARATUS FOR PROVIDING TELEPHONE SUPPORT FOR INTERNET SALES

(75) Inventors: Craig L. Reding, Midland Park, NJ (US); Suzi Levas, Nanuet, NY (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/141,166

(22) Filed: May 31, 2005

(65) Prior Publication Data

US 2005/0220289 A1    Oct. 6, 2005

Related U.S. Application Data

(63) Continuation of application No. 09/596,466, filed on Jun. 19, 2000, now abandoned.

(51) Int. Cl.
*H04M 3/523* (2006.01)
*G06F 15/16* (2006.01)
*H04L 12/28* (2006.01)
*H04L 12/66* (2006.01)

(52) U.S. Cl. ............ 379/265.09; 370/352; 379/210.01; 379/265.12; 709/206; 709/227

(58) Field of Classification Search ............ 379/265.12, 379/210.01, 265.09, 265.11, 265.13; 370/352; 709/204, 206, 227

See application file for complete search history.

(56) References Cited

U.S. PATENT DOCUMENTS

| | | | |
|---|---|---|---|
| 5,341,374 A | 8/1994 | Lewen et al. | |
| 5,430,719 A | 7/1995 | Weisser et al. | |
| 5,500,859 A | 3/1996 | Sharma et al. | |
| 5,537,470 A | 7/1996 | Lee | |
| 5,594,717 A | 1/1997 | Watanabe et al. | |
| 5,761,294 A | 6/1998 | Shaffer et al. | |
| 5,884,032 A * | 3/1999 | Bateman et al. ............ | 709/204 |
| 5,982,774 A | 11/1999 | Foladare et al. | |
| 5,991,308 A | 11/1999 | Fuhrmann et al. | |
| 6,134,530 A | 10/2000 | Bunting | |
| 6,141,412 A * | 10/2000 | Smith et al. ............ | 379/265.14 |
| 6,192,050 B1 * | 2/2001 | Stovall ........................ | 370/389 |

(Continued)

*Primary Examiner*—Harry S. Hong (57) ABSTRACT

Methods and apparatus for providing manned, e.g., live customer support to customers, e.g., people using the Internet to purchase goods and/or services are described. A person viewing a Web Site, e.g., a customer, is presented with a button which provides the opportunity to talk to a customer service representative. Upon activating the button, e.g., by clicking on it, the customer's computer or other Internet browser device sends a signal, e.g., a call request message, over the Internet indicating that the customer wants to talk with a service representative. The call request message includes the customer's telephone number and/or IP address. In response to the call request message, calling equipment is used to establish a customer service call between the customer and a customer service representative. The equipment can be owned by the telephone company thereby avoiding the need for E-business companies to make investments in telephone equipment. In addition, a customer service representative can be located either at the E-business site or remotely, e.g., at the customer service representative's private home or other site, with the representative being called by the conference equipment as required to service a customer. Voice over IP conference equipment may be used instead or in conjunction with telephone conference equipment where one or both of the customer and service representative have voice over IP capability.

9 Claims, 7 Drawing Sheets

U.S. PATENT DOCUMENTS

| | | | |
|---|---|---|---|
| 6,282,284 B1 * | 8/2001 | Dezonno et al. | 379/265.09 |
| 6,327,258 B1 | 12/2001 | Deschaine et al. | |
| 6,678,718 B1 * | 1/2004 | Khouri et al. | 709/204 |
| 6,760,429 B1 * | 7/2004 | Hung et al. | 379/265.09 |
| 6,823,384 B1 * | 11/2004 | Wilson et al. | 709/225 |
| 6,925,054 B1 | 8/2005 | Atterton et al. | |
| 7,092,379 B1 | 8/2006 | Singh et al. | |
| 7,274,662 B1 | 9/2007 | Kalmanek et al. | |
| 2004/0039846 A1 * | 2/2004 | Goss et al. | 709/248 |

* cited by examiner

| WEB SERVER ADDRESS INFORMATION | CUSTOMER TELEPHONE NUMBER | WEB PAGE INFORMATION | DESIRED CONTACT TIME | ADDITIONAL INFORMATION |
|---|---|---|---|---|
| 702 | 704 | 706 | 708 | 710 |

| CALLING EQUIPMENT ADDRESS INFORMATION | BUSINESS IDENTIFIER | PASSWORD | CUSTOMER TELEPHONE NUMBER | CUSTOMER SERVICE REPRESENTATIVE TELEPHONE NUMBER | DESIRED CONTACT TIME |
|---|---|---|---|---|---|
| 802 | 804 | 806 | 810 | 812 | 814 |

| CALLING EQUIPMENT ADDRESS INFORMATION | BUSINESS IDENTIFIER | WEB PAGE INFORMATION | CUSTOMER TELEPHONE NUMBER | CUSTOMER SERVICE REPRESENTATIVE INFORMATION | DESIRED CONTACT TIME |
|---|---|---|---|---|---|
| 902 | 904 | 906 | 908 | 910 | 912 |

900

METHODS AND APPARATUS FOR PROVIDING TELEPHONE SUPPORT FOR INTERNET SALES

CROSS-REFERENCE TO RELATED APPLICATIONS

This is a continuation of prior U.S. patent application Ser. No. 09/596,466, filed Jun. 19, 2000, now abandoned entitled "METHODS AND APPARATUS FOR PROVIDING TELEPHONE SUPPORT FOR INTERNET SALES."

FIELD OF THE INVENTION

The present invention is directed to communications systems and, more particularly, to methods and apparatus for providing telephone services in response to signals received over the Internet.

BACKGROUND OF THE INVENTION

Electronic commerce is growing at an astonishing rate and is likely to capture an ever growing segment of retail and business sales from conventional stores.

One particularly attractive feature of Internet commerce is the relatively low entry costs, in terms of physical overhead, associated with starting an E-commerce business. An E-commerce business can be started with little more than a Web server for hosting the business's Web site, and the staff and accessories needed to ship and bill for products ordered over the Internet. Rent and other business overhead can be minimized by locating the E-commerce business at a relatively remote location where building rents are low while high speed Internet access and shipping services are still accessible.

Initially, many small E-commerce businesses are started out of peoples homes or existing business sites with a minimal amount of investment in physical hardware.

From a consumer standpoint, ordering of goods and/or services via the Internet offers many advantages. often the goods are offered at a lower price than that charged by conventional retailers. In addition, the vast number of businesses which can be accessed via the Internet allows customers the ability to order both common and hard to find goods and services from the convenience of their home.

Internet orders are usually made via the exchange of electronic information between a customer's computer and a Web server hosting an E-business Web site to which the order is directed. The order process is normally an automated one which lacks any live human involvement on the part of the E-business retailer.

Many potential E-business customers find the lack of human involvement on the part of the E-business retailer unsatisfactory. In the case of expensive purchases, customers often seek an oral acknowledgement from a human being that the order was received and is being processed properly. This is often exhibited in the form of a telephone call being placed by the customer to the E-business after an order is mare.

The inability to orally present questions to a sales representative during an E-business transaction is another area which many potential E-business customers find unsatisfactory. In many cases, sales are lost because a customer does not want to present their questions in E-mail form.

Another complaint with E-commerce is that many businesses which sell over the Internet have poor customer support. In many cases, people complain about being unable to contact service representative to discuss the status of an order or other order related problems.

Large electronic retailers can make significant investments in telephone equipment such as PBXs which can be used in placing calls to customers and servicing calls received from customers. However, many smaller E-commerce start-up are unwilling or unable to make such investments in telephone equipment.

The cost associated with PBX and other telephone equipment is one reason Internet businesses have poor telephone support. Another reason is the cost associated with having people available to respond to questions which may be raised 24 hours a day, 7 days a week.

Often the demand to speak with sales representatives and customer service people will vary during different times of the day. Unfortunately, sales representatives who have to commute to work are often unwilling to work only a few hours a day or with large intervals of unpaid breaks, e.g., several hours, between work periods. Thus, in order to have customer service representatives available to satisfy peak demands often means that service representatives will need to be paid for off-peak periods of time during which they may be idle.

In view of the above discussion, it is apparent that there is a need to improve the ability of E-commerce customers to interact, e.g., over the telephone, with service representatives. There is also a need for methods of providing Internet businesses the ability to provide telephone support to Internet customers without having to make substantial investments in telephone equipment such as PBXs. It is also desirable that at Least some methods reduce or eliminate the need for customer service representatives to commute to a centralized location or office to work.

The business's Internet server receives the call request message and identifies an available customer service representative who can service the call request. Once a customer service representative is assigned to handle a call request, relevant information is transmitted to a computer used by the identified customer representative via, e.g., the Internet or a local area network (LAN). In addition, a customer service call is initiated between the customer and the identified customer service representative using, e.g., the customer telephone number information included in the call request message or a customer telephone number retrieved from a database.

The customer service call may be initiated by sending, in the form of a customer service call initiation message, a telephone switch, conference bridge, intelligent peripheral device, AIN circuitry such as an ISCP (integrated service control point) or other telephone equipment with call initiation capability, the telephone number of the customer to be called and the telephone number of the service representative. The customer service call information may be transmitted via the Internet or a LAN to the device which is responsible for establishing the customer service call. In addition to the telephone number information, the customer service call initiating message may include, e.g., a business identifier and/or password. The business identifier is used for billing purposes while the password is used to ensure that the identified business is the party requesting the customer service call. All or portions of the customer service call initiating message may be encrypted.

In order to use customer representatives' time in an efficient manner, the calling equipment may be programmed to call the customer first. Once the customer answers the phone, an automated message is played to the customer requesting that the customer hold while being connected to a customer service representative. An exemplary message played to the customer may be, e.g., "Please hold while we connect you to a ABC company customer representative.", where ABC is the name of the company identified in the customer service call initiating message or call request message. While the customer is being played the message, the calling equipment calls the customer service representative and bridges the calls between the sales representative and the customer. In such an embodiment, the customer service representative's time is not wasted waiting for the customer to answer the phone or on calls which go unanswered by the customer.

The above discussed technique of establishing a customer service call between a customer viewing a Web site and a customer service representative has several advantages. From a customer's perspective, it allows a customer to talk with a customer representative without having to place a call often while still viewing the Web page which was responsible for prompting the desire to talk to a customer representative in the first place. From an E-business perspective, it allows for such calls to be placed without having to make an investment in telephone calling equipment such as a PBX, call bridging equipment, conference calling equipment or other expensive telephone equipment. This is because, in accordance with the present invention, such equipment may be owned and located at a telephone company site as opposed to the E-business owner's site. The above described method also allows for efficient use of customer representatives' time and allows customer representatives to work from home if desired. Since customer representatives can work from home, they may be more willing to work part time, split shifts, or work at unusual hours such as nights, weekends or late evenings since they can do so from the comfort and convenience of their own homes.

While the methods of the present invention have been discussed above in the case of an embodiment where the call request message is first transmitted to a company's Internet server, the call request message may be transmitted directly from the customer's computer to telephone equipment having call initiation and, optionally, call bridging capabilities, e.g., via the Internet. In such an embodiment, the telephone number of the agent to be contacted, or, e.g., an 800 number corresponding to a customer service center, may be incorporated into the customer's call request message in addition to the customer's telephone number. This telephone number may be obtained from information included in the Web page which included the button which was responsible for initiating the generation of the call request message. Alternatively, the calling equipment may be responsible for identifying the telephone number of an available customer service representative using a business identifier included in the call request message and any one of a number of known automated call distribution techniques.

After identifying the telephone number of the service agent to be used in a customer service call, in response to the call request message, the calling equipment establishes a call between the customer and customer service representative, e.g., in the manner discussed above.

In the above manner, the methods and apparatus of the present invention can be used to facilitate E-business transactions, reduce or eliminate the need for E-businesses to make substantial investments in telephone equipment and, at the same time, provide a customer service representative greater opportunities to work from home.

The methods of the present invention can be used to provide customer support using voice over IP as opposed to voice over the telephone. In such an embodiment, IP calling equipment is substituted for the described telephone calling equipment. In addition, Internet, e.g., IP, addresses are substituted for telephone numbers.

Various additional features and advantages of the present invention will be apparent from the detailed description which follows.

DETAILED DESCRIPTION

As discussed above, the present invention is directed to methods and apparatus which can be used to provide live, e.g., telephone based, customer support to customers, e.g., people using the Internet to purchase goods and services.

Figure 1:
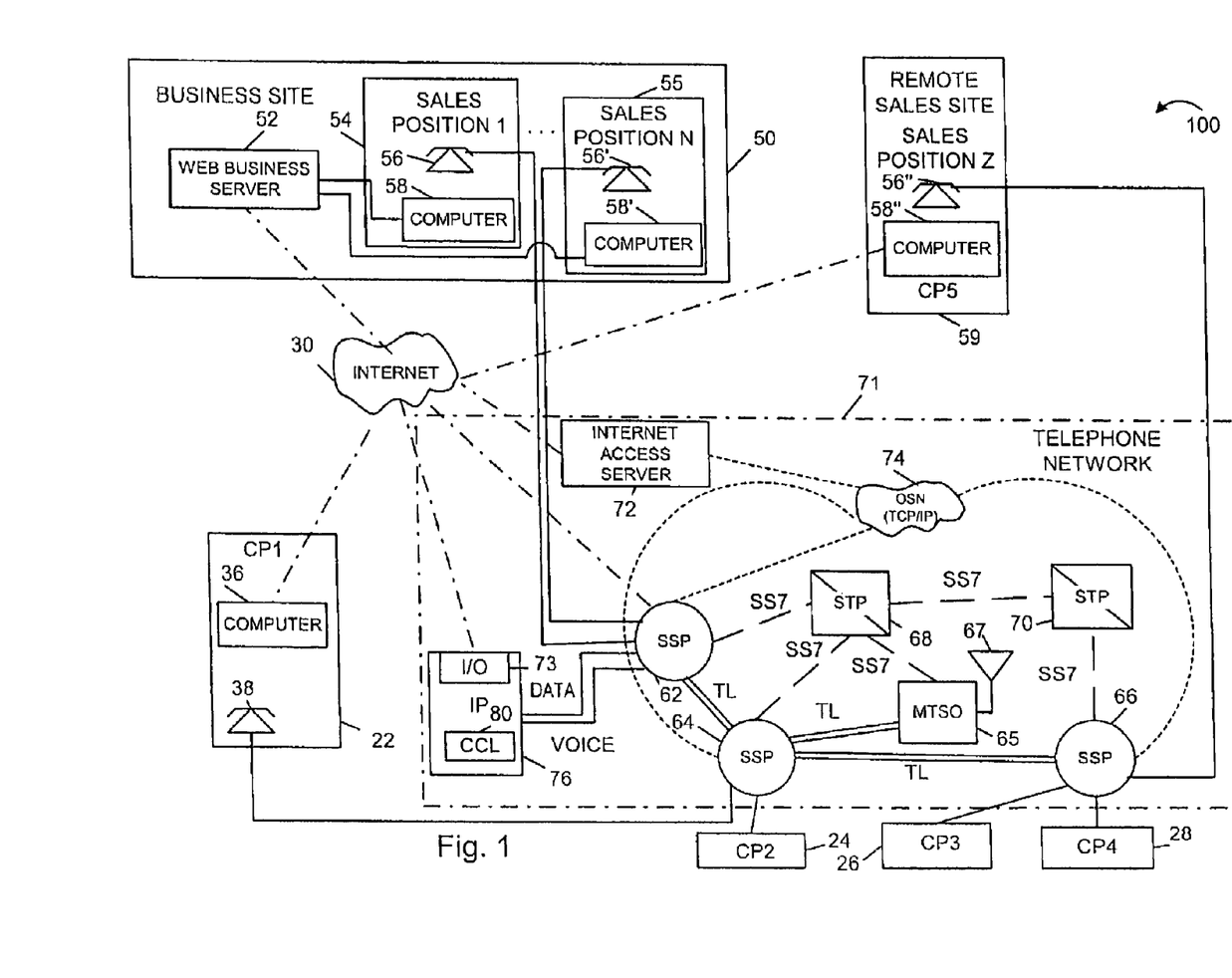
FIG. 1 illustrates a communication system implemented in accordance with an exemplary embodiment of the present invention.

FIG. 1 illustrates a communications system implemented in accordance with the present invention. As illustrated, the system 100 includes first through fourth customer premises 22, 24, 20, 28, a telephone network 71, business site 50, a separate computerized sales site 59 and the Internet 30. The Internet connects the various components together so that messages, data and information can be transmitted between the system components using, e.g., TCP/IP.

The first customer premise includes a computer system 36 and a telephone 38. The computer system 36 is coupled to the Internet 30. While not discussed in detail herein, the telephone network 71 may be used to connect customer premises to the Internet 30. The telephone 38 is coupled to a telephone switch, e.g., a signal switching point 62, of the telephone network 71.

The computer system 36 may be used by an individual, e.g., a customer, located at the first customer premises 22, to browse the World Wide Web, e.g., for purposes of shopping on-line. The telephone 38 may be used by the customer to make and receive calls. Assuming that the customer has DSL, ISDN or multiple telephone lines or another connection to the Internet which does not prohibit voice calls over the phone 38 while the computer system 36 is "on-line", e.g., in active contact with the Internet, the customer may be contacted by a customer service representative via telephone 38 while still on-line using the computer 36.

Each of the second, third and fourth subscriber premises 24, 26, 28 may include a computer 36 and telephone 38. In such an embodiment, each subscriber premises would be connected to the Internet 30 as well as the telephone network 71.

While on-line, the customer may access, view and respond to Web pages presented to the customer from business site 50. Business site 50 includes a Web server 52 and a plurality of sales positions, e.g., sales positions 1 (54) through N (55).

Each sales position 54, 55 includes a telephone 56, 56' and a computer 58, 58'. The telephone 56, 56' is coupled to the telephone network 71 while the computer 58, 58' is coupled to the Web business server 52. A customer representative, e.g., a live human sales representative, can talk with customers via the telephone 56, 56' while accessing Web page information, customer information, and/or entering sales order information using the computer 58 or 58'.

The Web Business server 52 performs a variety of functions including Web Page hosting, maintaining of sales information and records, assignment of customer representatives to service particular customers and the generation of customer service call initiation messages. In one embodiment, the server 52 maintains information on customer service representative availability and assigns customer call requests to particular customer service representatives and sales positions, as a function of sales representative's availability and/or expertise.

Note that in the FIG. 1 embodiment, the business site 50 does not include a PBX or other telephone equipment. Since the telephone network and telephone conferencing equipment included therein is used to support customer service calls, the need for a PBX is avoided. However, in some embodiments, it is contemplated that a PBX would be included at the business site, with the telephone network providing call initiation and bridging capability, e.g., for remote customer service representatives such as the one located at remote sales site 59.

The remote sales site 59, like sales positions 1 through N, includes a telephone 56" and computer 58". Sales site 59 may be, e.g., the home of a customer service representative. The computer is coupled to the Web business server via the Internet 30 while the telephone 56" is coupled to the telephone network 71. Sales information, customer service representative availability information, customer information as well as other business information can be exchanged between the Web business server 52 and the computer 58" via the Internet. Communications between the computer 58" and business Web server 52 may be encrypted for security purposes. Customer service calls including calls initiated in response to a call request message sent to the Web server 52 can be handled from phone 56". Because computer and telephone customer service support can be implemented from any site equipped with a computer and a telephone, the calling techniques of the present invention allow human customer service representatives to work from home if desired.

The telephone network 71 includes operational switching network (OSN) 74, a plurality of signal switching points 62, 64, 66, a mobile telephone switching office 65, an antenna 67, a plurality of signal transfer points (STPs), and an Internet access server 72. The OSN couples together the Internet access server 72, and SSPs 62, 64, 66. The OSN 74 is a TCP/IP based network which allows telephone switches, the Internet Access server, telephone operator stations, and other telephone network devices to exchange data as well as control and switching information. Accordingly, OSN 74 can be used to transmit control signals used for establishing customer service calls to various components of the telephone network 71.

The SSPs 62, 64, 66 may be implemented using telephone switches with call bridging/conferencing capability, e.g., Class V telephone switches. The signal transfer points 68, 70 link the SSPs and MTSO 68 together via signaling and data lines over which information can be communicated between the SSPs in accordance with signaling system seven (SS7).

In addition to being coupled to the OSN 74 and STPs, the SSP 62, 64, 66 may also be coupled to the Internet and/or one or more peripheral devices 76. Such devices are sometimes referred to as intelligent peripherals (IPs) because they perform logic functions in addition to providing conference bridges, speech recognition circuits and other telephone switch peripheral devices. The illustrated IP includes an input/output interface 73 for coupling the IP 76 to the Internet and to the SSP 62. it also includes calling logic 80 used for establishing customer service calls in response to customer service call request messages and/or customer service call initiation messages received via the Internet 30.

The telephone networks Internet access server 72 interfaces between the Internet 30 and the OSN 74. The Internet Access server 72 provides security, e.g., it serves as a firewall, to insure that unauthorized users are not granted access to the OSN 74 and thereby permitted to control telephone switch operation. Customer service call request messages may be sent via the Internet to the Internet Access server 72. If the businesses sending the customer service call request message is recognized as a customer service call service subscriber, and the sender's PIN or password is confirmed, the Internet Access Server will proceed to establish the requested customer service call by passing the necessary customer service call setup instructions and data to one of the telephone switches, e.g., SSPs 62, 64, 66, via the OSN 74.

Thus, a customer service call may be initiated by sending a message over the Internet to the IP 76 or to the Internet access server. Alternatively, a call conference may be initiated by sending a call request message or a customer service call initiation message directly to a telephone network switch, e.g., SSP 62, which has an Internet interface. In the case where telephone switches are allowed to receive messages and data directly from the Internet, firewall protection is incorporated into the switch's Internet interface to reduce the possibility of unauthorized use and/or control of the telephone switch.

Figure 2:
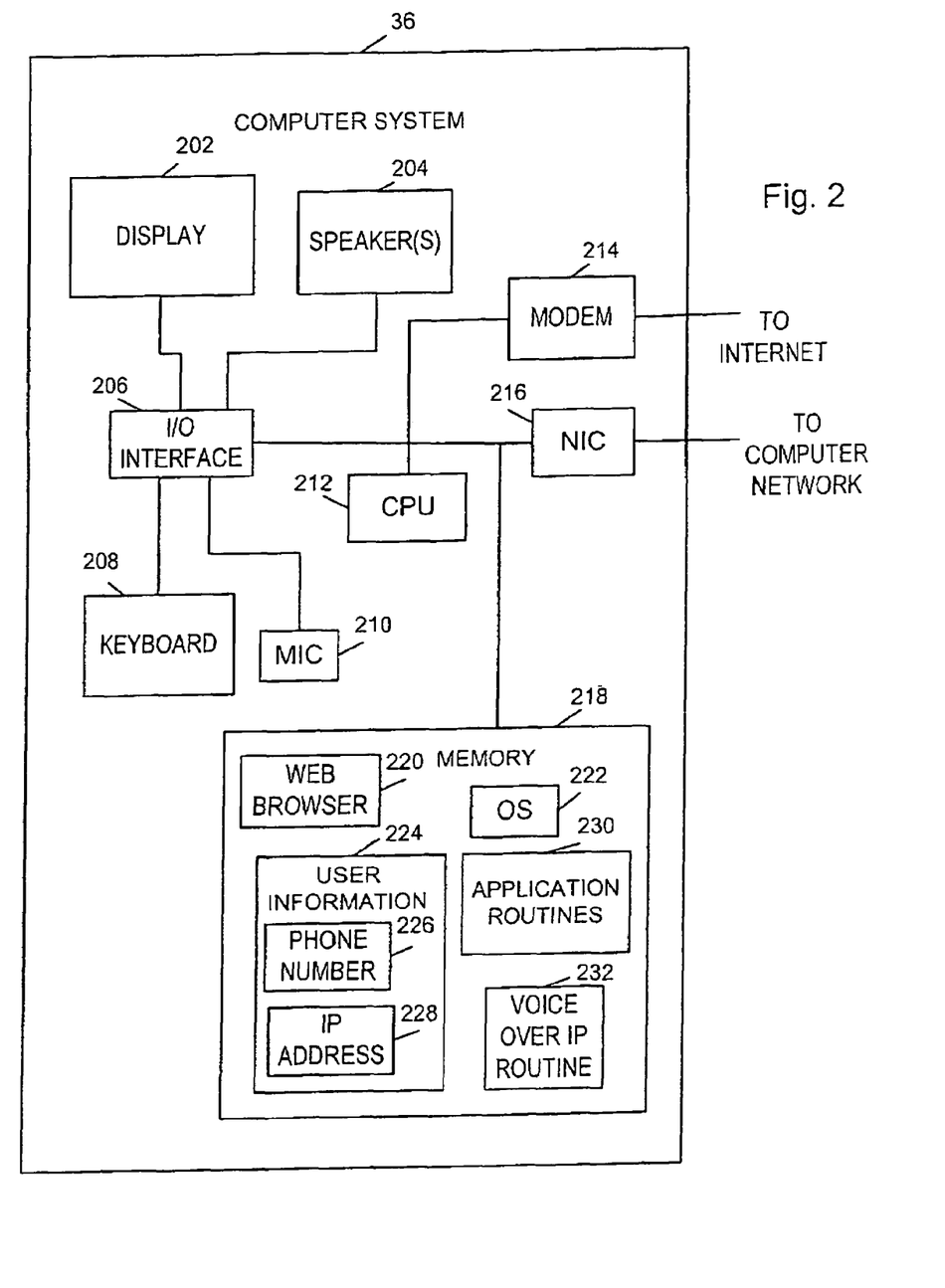
FIG. 2 illustrates a computer system suitable for use by an E-business customer in the system of FIG. 1.

FIG. 2 illustrates an exemplary computer system 36 which may be used by a customer browsing the Internet. The computer system 36 comprises a CPU 212, modem 214, NIC 216, memory 218 and an input/output (I/O) interface 206 which are coupled together by a bus 201. The I/O interface 206 couples a plurality of input/output devices, including a display 202, speakers 204, keyboard 208 and MIC 210, to the bus 201.

The memory 218 includes applications as well as data that may be executed and/or processed by the CPU 212. In particular, memory 218 includes a web browser 220, an operating system 222, a voice over IP routine 232, and user information 224. The user information 224 includes a phone number 226 and an IP address 228, e.g., the phone number and IP address of the customer using the computer system 36. The computer system 36 may be coupled to the Internet via the modem 214. Alternatively it may be connected to the Internet through a computer network to which the computer system is coupled via network interface card (NIC) 216.

The user of the computer system 36 may supply his or her phone number to the computer system 36 for future use when being contacted, e.g., by a customer service representative, at the time the operating system 222 is installed, when the web browser 220 is installed, or at the time the customer activates a button on a web page requesting that a customer service representative contact them.

Figure 3:
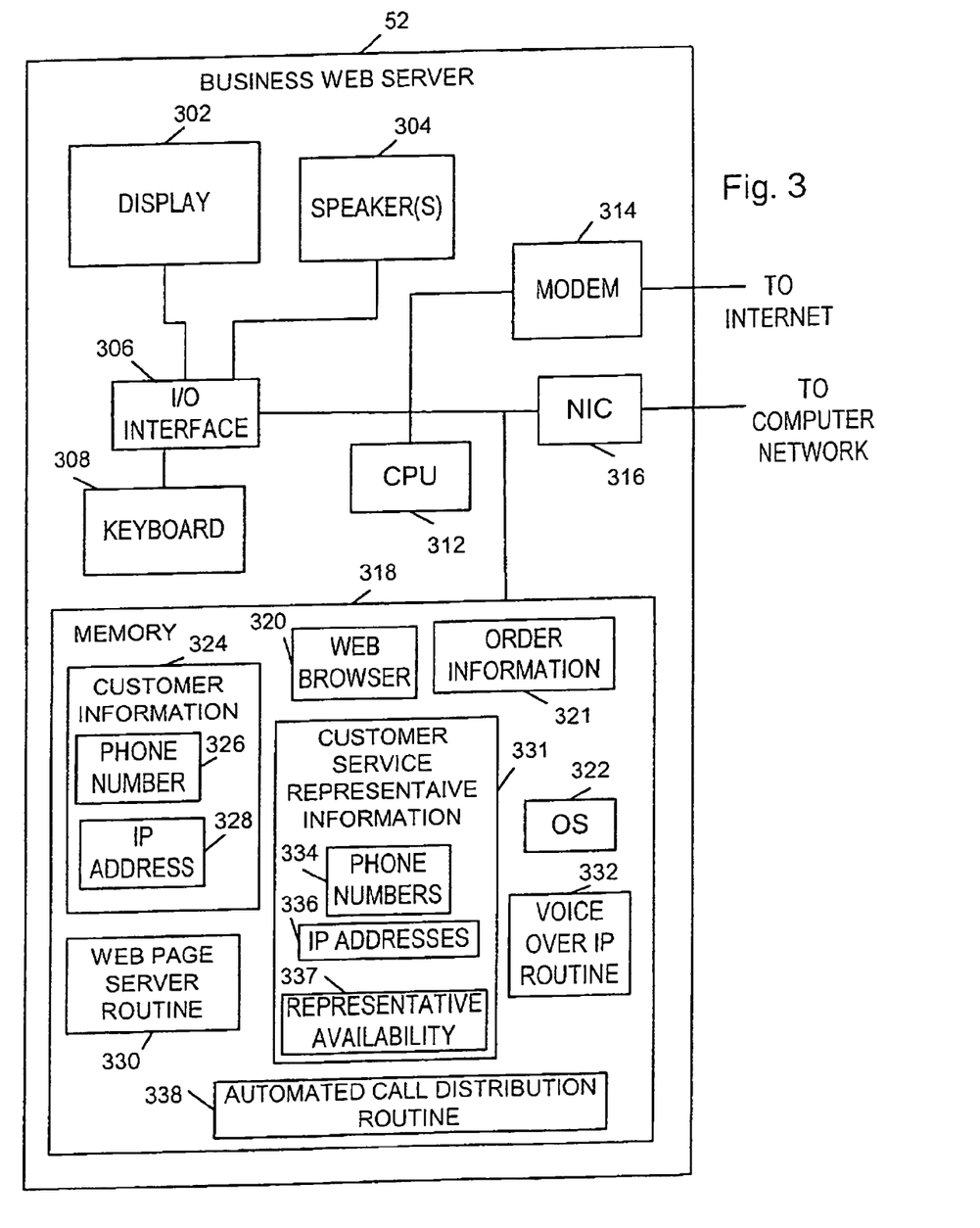
FIG. 3 illustrates a computer system that may be used as the business Web server of FIG. 1.

FIG. 3 illustrates a business Web server that may be used as the Web server 52 illustrated in FIG. 1. As illustrated, the Web server includes many of the same components as the computer system illustrated in FIG. 2. The business Web server includes a bus 201 which couples a CPU 312, modem 314, NIC 316, memory 318 and an input/output (I/O) interface 306 together. The I/O interface 306 couples a plurality of input/output devices, including a display 302, speakers 304, and keyboard 308 to the bus 201.

The memory 318 includes applications as well as data that may be executed and/or processed by the CPU 312. In particular, memory 318 includes a web browser 320, an operating system 322, a voice over IP routine 332, order information 321, customer information 324, customer service representative information 331, web page server routine 330, and an automated call distribution routine 338.

A voice over IP routine can be used to communicate and receive voice signals, e.g., to support audio communications over the Internet with a customer. Order information 321 includes information on received orders, e.g., orders for products offered for sale on the business's web page. Customer information 324 includes customer name and address information and, in some embodiments, phone number 326 and IP address information 328. The phone number 326 and/or IP address information can be used to contact the customer, e.g., in response to a request to be called by a customer service representative. The stored phone number and IP address information may correspond to information previously obtained from the customer.

Customer service representative information 331 includes customer representative availability information 337, customer service representative phone number information 334, and IP addresses information 336. The customer representative availability information 337 indicates when a customer service representative is available to handle customer service calls, e.g., is logged onto the representative computer system. This information can be supplemented with information received from the customer service representative's computer regarding the status of the representative at any given moment in time, e.g., information indicating whether or not the agent is busy servicing a customer. The customer service representative phone number information 334 and IP address information 336 identifies the phone number and IP address of the computer being used by each customer service representative. The customer representative phone number information can be used by the automated call distribution (ACD) routine 338 to formulate customer service call initiation messages in response to call request messages received from customers.

The automated call distribution routine 338 is responsible for processing received call request messages. When a call request message is received, the ACD routine 338 identifies an available customer service representative, or one that will be available in the near future, using, e.g., the customer service representative availability information 337. The ACD routine then formulates a customer service call initiation message using the telephone number of the customer to be called and the telephone number of the customer service representative assigned to handle the call. In addition to assigning a customer service representative to handle the call, the ACD routine also forwards to the assigned customer service representative customer information and information about the Web page that was being viewed by the customer at the time the call request was initiated. This information may be transmitted to the assigned customer representative computer over the Internet or a LAN.

Figure 4:
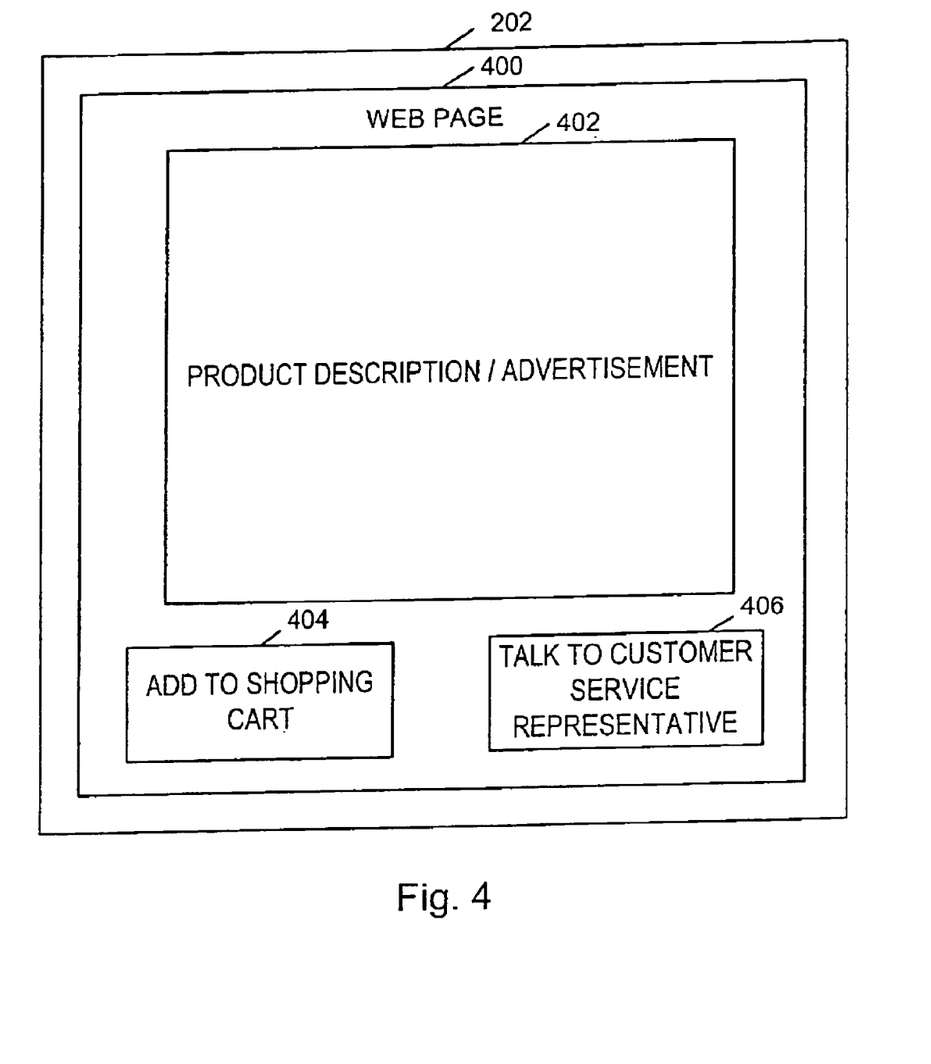
FIG. 4 illustrates an exemplary Web page displayed on a display device in accordance with the present invention.

FIG. 4 illustrates an exemplary web page 400 of the present invention being displayed on the display 202 of computer system 36. The Web page 400 is displayed by the customer's Web browser 220 after being received over the Internet from the Web server 52. As illustrated, the page 400 includes a product description/advertisement area 402, an add to shopping cart button 404, and a talk to customer service representative button 406.

In response to the activation of the talk to customer service representative button 406, e.g., by double clicking on it, the Web browser generates a call request message.

Figure 5:
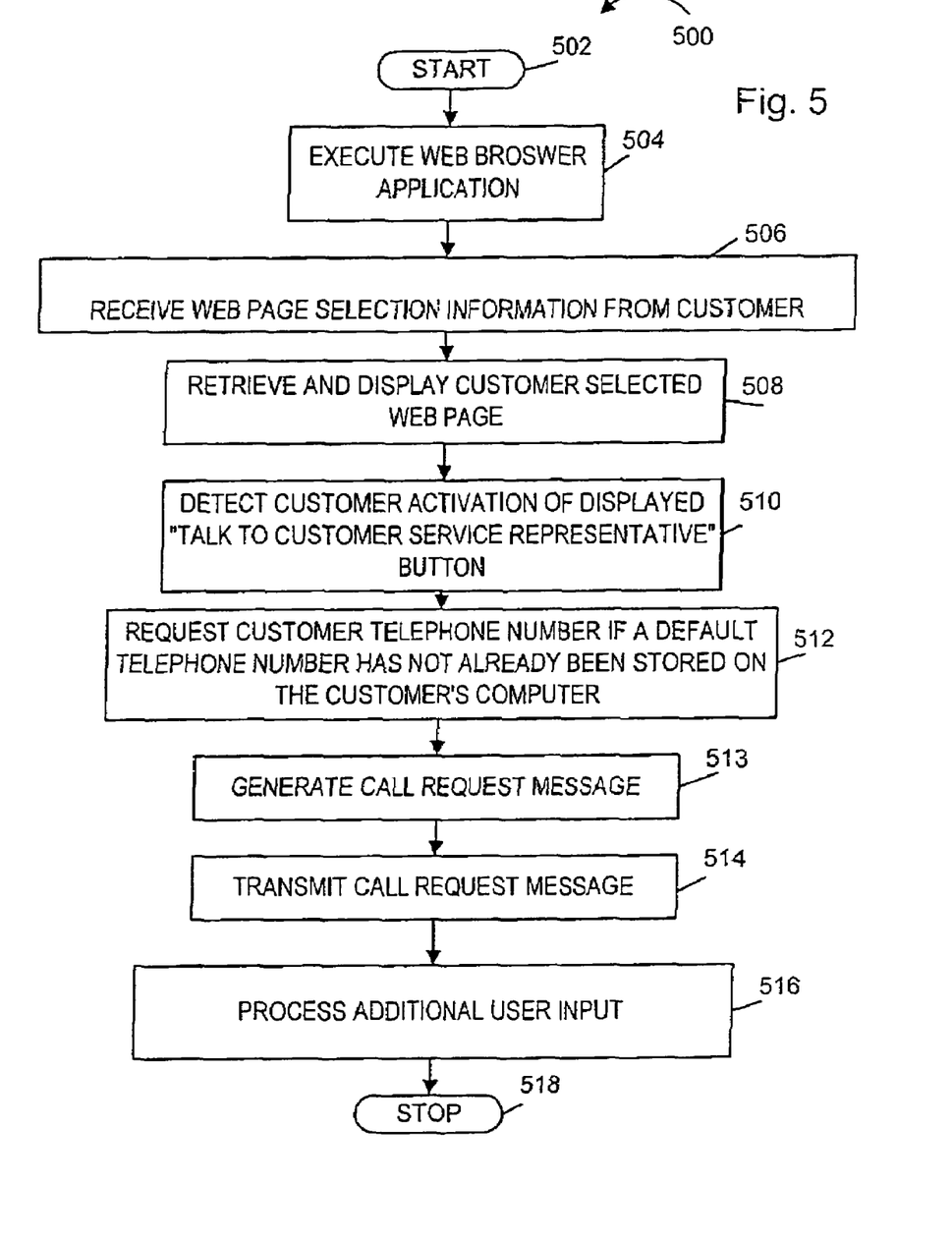
FIG. 5 is a flow chart illustrating various steps performed by a consumer's computer system in accordance with the present invention.

The display of Web page 400 occurs as part of the normal operation of a customer's computer, e.g., while the customer is browsing the Internet. FIG. 5 is a flow chart 500 illustrating the steps performed by a customer's computer in accordance with the present invention.

Computer operation starts in step 502 with the computer being turned on. Operation proceeds to step 504 wherein the computer 36 executes the Web browser application 220. In step 506 the computer 36 receives web page selection information, e.g., a web site URL, from the customer. This information may be entered, e.g., using keyboard 208.

Next, in step 508, the web page corresponding to the site selected by the customer is retrieved and displayed. In this manner, the Web page 400, including the "talk to service representative" button may be displayed to a customer.

In step 510, activation of the "talk to customer service representative" button 406, e.g., by the customer clicking on the button, is detected. Next in step 512, the computer system requests that the customer provide the telephone number at which he/she wishes to be called. In step 512, the request for the telephone number is skipped if a telephone number has already been stored on the customer's computer. From step 512 operation proceeds to step 513. In step 513 a call request message is generated.

The call request message is generated from information obtained from the Web page as well as information provided by the customer. For example, the call request message may include a Web server address or the address of telephone conference equipment which was obtained from the Web page 400 and, optionally, a business identifier, obtained from the Web page 400. In addition it may include a customer telephone number and/or customer identifier. In the case where voice over IP is supported IP addresses may be provided in the place of telephone numbers. Call request messages may also include Web page information, information on the time the customer wishes to be contacted and additional information such as a brief note from the customer indicating the purpose or planned subject of the call.

In accordance with the present invention, the Web page will normally include information identifying the contact address, e.g., the address of a Web server or conference equipment, to be used when sending a call request message. The contents of the call request message may vary depending on whether the message is being sent to a Web server or telephone conference equipment.

Figure 7:
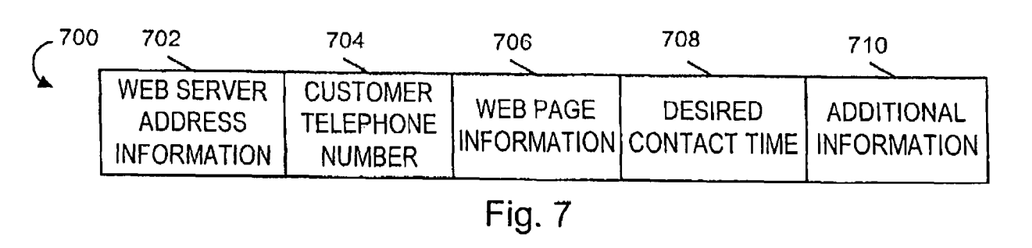
FIG. 7 illustrates a first exemplary call request message.

FIG. 7 illustrates an exemplary call request message 700 which is generated when the Web page 400 includes a Web server address as the contact address for call request messages. The exemplary call request message 700 includes a Web server address 702, customer telephone number 704, web page information 706, desired contact time information 708 and additional information, e.g., a brief message from the customer. Customer identification information may also be included in the message 700. In cases where customer identification information is provided and the Web server has a contact telephone number stored for the customer, the customer telephone number may be omitted from the message.

Figure 9:
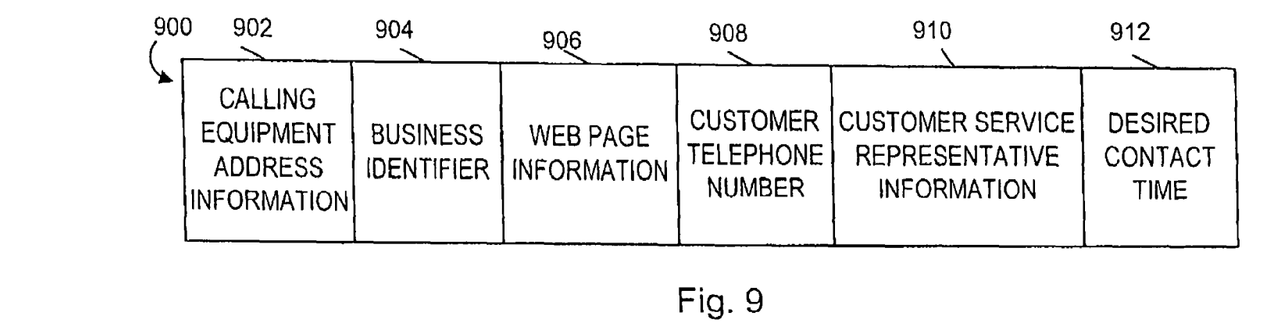
FIG. 9 illustrates a second exemplary call request message.

FIG. 9 illustrates an exemplary call request message 900 which is generated when the Web page 400 includes a telephone conference equipment address as the contact address for call request messages. As illustrated, the exemplary call request message 900 includes the telephone conference equipment address 902, a business identifier 904 which is normally obtained from the Web page 400, web page information 906, a customer telephone number 908, customer service representative information 910, and desired contact time 912.

The customer service representative information 910 is an optional service representative identifier which may be obtained from the Web page 400 being viewed at the time the customer activates the call request button. A business can assign different customer service representatives by incorporating different customer service representative information into its different web pages. For example a travel agency may use the customer service representative information to assign a cruise expert to handle calls originating from Web pages advertising cruises and an airline expert to Web pages advertising flights.

Referring once again to FIG. 5, once the call request message has been generated in step 513, operation proceeds to step 514. In step 514, the generated call request message is transmitted via the Internet to the Web server or conference equipment, e.g., telephone or voice over IP conference equipment, to which it is addressed.

From step 514 operation proceeds to step 516 wherein additional customer input is processed by the computer, e.g., additional web pages are accessed in response to input from the user. Operation stops in step 518, e.g., when the customer turns off the computer.

Figure 6:
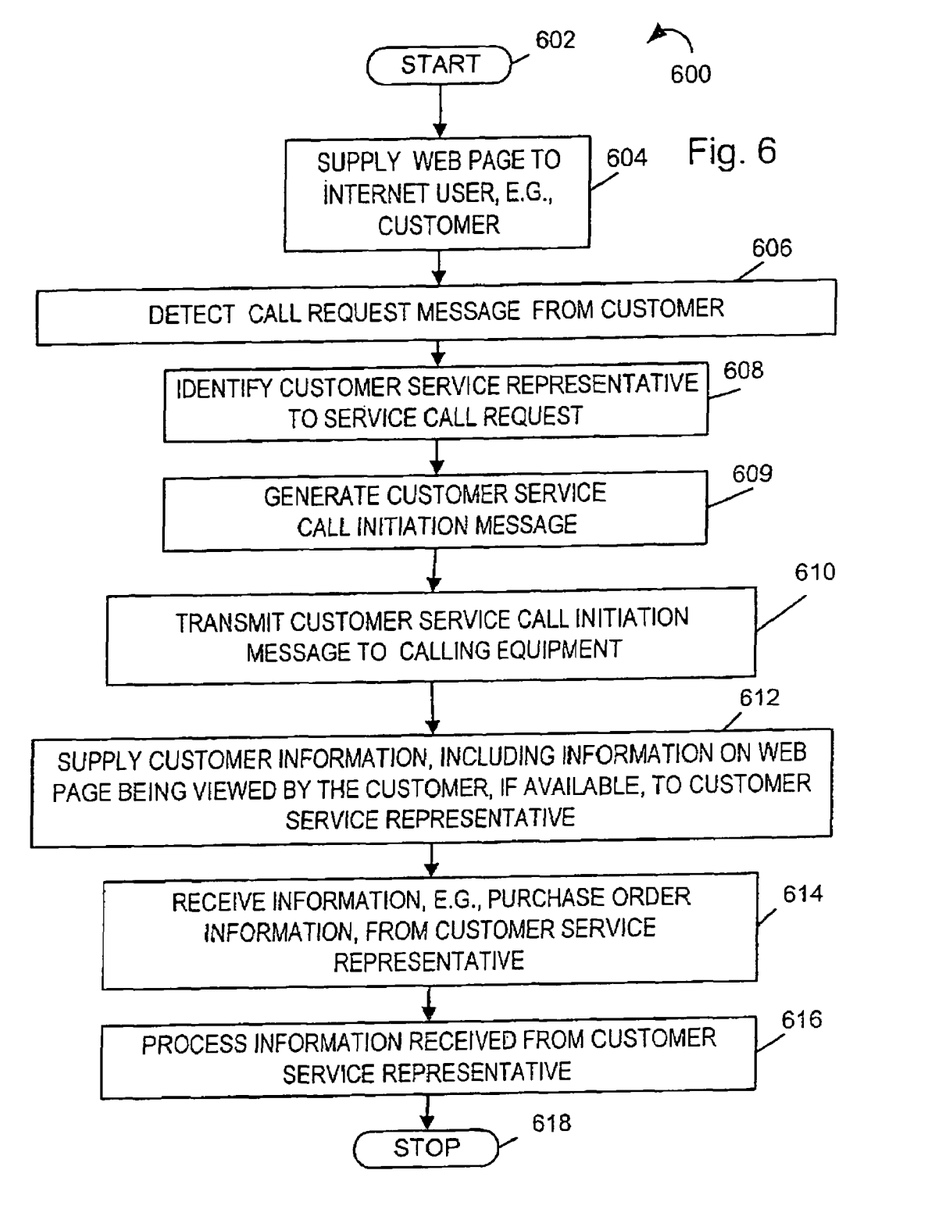
FIG. 6 is a flow chart illustrating various steps performed by a consumer's Web server in accordance with the present invention.

The method of the present invention as applied to a business Web server 52 will now be described with reference to FIG. 6. As illustrated in FIG. 6, operation of the Web server 52 begins in step 602 with the system being activated. In step 604 the Web server 52 provides an Internet user, e.g., customer, accessing a web site hosted by the Web server, a web page. In step 606, the Web server 52 detects a call request message from a customer. The received call request message is processed in step 608 with the Web server 52 identifying a customer service representative to service the call request. This may be done using the ACD routine 338. Once a customer service representative has been identified, e.g., assigned, to service the call request, a customer service call initiation message is generated in step 609. The customer service call initiation message includes information used by telephone conference equipment, to which the message is directed, to initiate and bill the customer service call.

Figure 8:
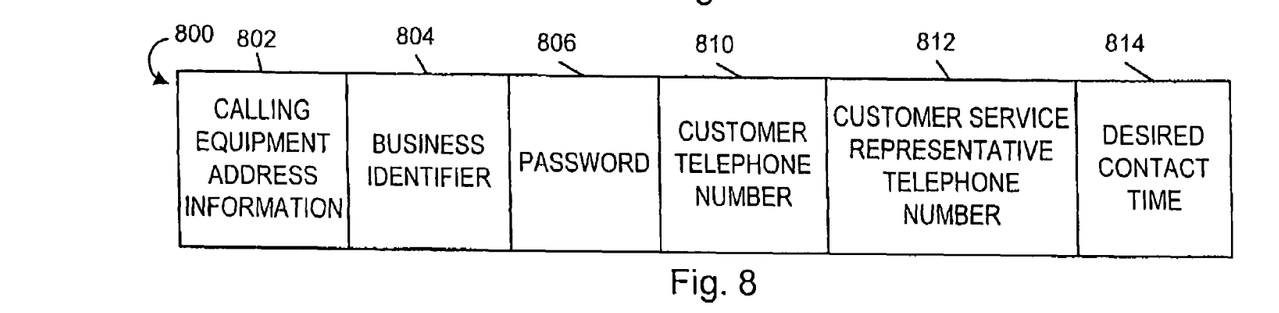
FIG. 8 illustrates an exemplary customer service call initiation message.

FIG. 8 illustrates an exemplary customer service call initiation message 800. As illustrated, the message 800 includes a telephone conference equipment address 802, a business identifier 804, a password 806, customer telephone number 810, customer service representative telephone number 812 and desired contact time information 814. In the case of voice over IP, the customer telephone number 810 and customer service representative telephone number 812 are replaced with Interent, e.g., IP addresses, for the customer and customer service representative, respectively.

The business identifier 804 identifies the business requesting that the call be initiated. Normally the identified business will be billed for the cost of the customer service call. Password 806 is used to confirm that it is actually the identified business requesting the call and not a computer hacker. The customer telephone number 810 and customer service representative telephone number 812 are the telephone numbers to be used when establishing the customer service call. Desired contact time 814 indicates the desired time of the customer service call. If this field is left blank or omitted, customer service calls are initiated by the calling equipment as soon as possible.

Referring once again to FIG. 6, once the customer service call message is generated, it is transmitted in step 610, e.g., over the Internet, to calling equipment which is responsible for initiating the customer service call between the customer and customer service representative.

In step 612, the Web server 52 supplies customer information, including information on the Web page or pages which were being viewed by the customer, to the customer service representative who was selected to handle the call. The information may be transmitted to the customer service representative's computer via the Internet or a local area network. Then in step 614, the Web server receives information from the customer service representative relating to the customer service call. The information may be, e.g., purchase order information, a complaint or some other information. The information is transmitted from the customer service representative computer to the Web server 52 via the Internet or the local area network.

In step 616, the information received from the customer service representative is Processed by the server 52 prior to Web server operation being stopped in step 618.

As discussed above, rather than transmit customer service call request messages to a Web server, they can, and in some embodiments are, transmitted directly to calling equipment. Call request messages of the type illustrated in FIG. 9 include sufficient information for calling equipment to initiate and bill for a customer service call in accordance with the present invention.

By having the business Web server receive call request messages instead of the calling equipment, the business using the calling service can have greater control of the assignment of calls to particular service representatives as well as control over which calling equipment, when several calling devices are available, will be used to handle individual calls.

While the term customer has been used herein to refer to an individual browsing the Internet and seeking to contact a business, it is to be understood that this term is to be interpreted broadly and is not limited to individuals who actually place orders with the business which is contacted. In addition, the term calling equipment is to be interpreted broadly as including IPs, telephone switches, conference bridges, and other devices capable of establishing customer service calls or bridging calls so that two parties may conduct a telephone call over telephone lines or a call using voice over IP.

Numerous variations on the above described methods and apparatus are possible without departing from the scope of the invention.

What is claimed is:

1. A method comprising:
   receiving a message from a user over an IP network representing a request for a call with a customer service representative, said message including an address corresponding to a server obtained from a web page, an internet address corresponding to the user, web page information and a note from the user indicating one of the purpose and planned subject of the call;
   in response to said message from a user, operating said server to;
   i) identify a customer service representative who can service the request for a call;
   ii) send a customer service call initiation message to equipment capable of initiating a call, said call initiation message including an equipment address corresponding to the equipment to which the customer service call initiation message is directed, one of an internet address and telephone number corresponding to said customer service representative; a business identifier; and the internet address corresponding to said user; and operating, in response to said customer service call initiation message, said equipment to establish a call between said user and the customer service representative said step of establishing a call between said user and said customer service representative including:
  i) initiating a call to the user;
  ii) initiating a call to said customer representative after said user has answered the call; and
  iii) bridging the call to the user and the call to the customer representative.

2. The method of claim 1, wherein at least a portion of said customer service call initiating message is encrypted.

3. The method of claim 1, wherein said call customer service call initiation message from said server further includes:
  a password.

4. The method of claim 3, further comprising:
  using said business identifier to identify a business to be billed for said call between said user and the customer service representative.

5. The method of claim 4, further comprising:
  using said password to ensure that the business identified by said business identifier is the party sending the call initiation message.

6. The method of claim 1,
  wherein said identified customer service representative is located at a home residence; and
  wherein said equipment capable of initiating a call is located at a telephone company site.

7. The method of claim 6, wherein said telephone company site is different from a business site owned by the identified business.

8. The method of claim 7, wherein said server is a server corresponding to the identified business.

9. The method of claim 7, wherein said internet address corresponding to the user and said internet address corresponding to said customer service representative are IP addresses.

\* \* \* \* \*